US009156419B2

(12) United States Patent
Yotsunaga et al.

(10) Patent No.: US 9,156,419 B2
(45) Date of Patent: Oct. 13, 2015

(54) BUMPER ATTACHMENT STRUCTURE

(71) Applicant: Nissan Motor Co., Ltd., Kanagawa (JP)

(72) Inventors: Yasuo Yotsunaga, Kanagawa (JP); Tomoaki Matsuoka, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/381,239

(22) PCT Filed: Feb. 19, 2013

(86) PCT No.: PCT/JP2013/053937
§ 371 (c)(1),
(2) Date: Aug. 27, 2014

(87) PCT Pub. No.: WO2013/129174
PCT Pub. Date: Sep. 6, 2013

(65) Prior Publication Data
US 2015/0102616 A1    Apr. 16, 2015

(30) Foreign Application Priority Data

Feb. 28, 2012    (JP) ................................ 2012-041337

(51) Int. Cl.
*B60R 19/24*    (2006.01)
(52) U.S. Cl.
CPC ........... *B60R 19/24* (2013.01); *B60R 2019/247* (2013.01)
(58) Field of Classification Search
CPC .......................... B60R 19/24; B60R 2019/247
USPC ............................ 296/198, 29, 121; 293/155
See application file for complete search history.

(56) References Cited

U.S. PATENT DOCUMENTS

| 7,540,550 | B1 * | 6/2009 | Huber et al. | ................... 296/29 |
| 7,914,070 | B2 * | 3/2011 | Fayt | ........................ 296/193.09 |
| 7,931,318 | B2 * | 4/2011 | Matsumura | ................... 293/133 |
| 8,517,461 | B2 * | 8/2013 | Huber | ..................... 296/203.02 |
| 8,567,853 | B2 * | 10/2013 | Huber et al. | ............. 296/193.09 |
| 2005/0062308 | A1 | 3/2005 | Pfister et al. | |

FOREIGN PATENT DOCUMENTS

EP    1516804 A2    3/2005

OTHER PUBLICATIONS

Extended European Search Report issued in European Application No. 13754530.7, mailed on Jan. 13, 2015 (6 pages).
International Search Report for corresponding International Application No. PCT/JP2013/053937, mailed Apr. 9, 2013 (2 pages).
Written Opinion for corresponding International Application No. PCT/JP2013/053937, mailed Apr. 9, 2013 (4 pages).

(Continued)

Primary Examiner — Pinel Romain
(74) Attorney, Agent, or Firm — Osha Liang LLP

(57) ABSTRACT

A bumper attachment structure includes a flange of a bumper fascia provided with a guide portion protruding therefrom and a flange of a fender panel having an insertion hole into which the guide portion can be inserted. The bumper attachment structure also includes an attachment bracket having a groove in which the guide portion can be housed and an insertion fitting portion in which a tip portion of the attachment bracket can fit.

10 Claims, 10 Drawing Sheets

(56) References Cited

OTHER PUBLICATIONS

International Preliminary Report on Patentability issued in corresponding International Application No. PCT/JP2013/053937, issued Sep. 2, 2014 (5 pages).

Nissan Motor Co., Ltd., relevant portion of the Service Manual for the FUGA Y51-Type Vehicle (sold in the U.S. as the Infinity Q70 vehicle), Nov. 2009 (6 pages).

Relevant portion of the Service Manual for a Infinity Q70 vehicle (sold in Japan as a FUGA Y51 vehicle), serving as an English translation for the FUGA Y51-Type Vehicle Service Manual (6 pages).

View of front bumper described in the Nissan Motor Co., Ltd., "FUGA Y51-Type Vehicle Service Manual," Nov. 2009 (1 page).

* cited by examiner

BUMPER ATTACHMENT STRUCTURE

CROSS-REFERENCE TO RELATED APPLICATIONS

This application is a National Stage application of International Patent Application No. PCT/JP2013/053937, filed on Feb. 19, 2013, which claims priority to Japanese Patent Application No. 2012-041337, filed on Feb. 28, 2012. Both International Patent Application No. PCT/JP2013/053937 and Japanese Patent Application No. 2012-041337 are hereby incorporated by reference in their entirety.

TECHNICAL FIELD

The present invention relates to a bumper attachment structure for attaching a bumper to a vehicle.

BACKGROUND ART

There is known a structure for attaching a front bumper having a horn-shaped portion to a front fender panel (for example, refer to Non-Patent Literature 1).

The horn-shaped portion of the front bumper is provided with a bent flange having a plurality of pins protruding therefrom. The front fender panel is provided with a bent flange having insertion holes into which the pins can be inserted. A plate-shaped bracket used for attachment is also provided with insertion holes into which the pins can be inserted.

The pins on the front bumper side are first inserted into the insertion holes formed in the flange of the front fender panel so that tip portions of the pins protrude from the flange of the front fender panel. Then, while the tip of the bracket is allowed to fit into an insertion fitting portion formed on the front bumper, the bracket is moved to swing so that the protruding portions of the pins are inserted into the insertion holes of the bracket. Thereafter, the bracket is fixed to the flange of the front fender panel and the front bumper with fixing bolts.

Accordingly, the flange of the front fender panel is held between the bracket and the front bumper so that the front bumper is attached to the front fender panel.

CITATION LIST

Patent Literature

Non-Patent Literature 1: FUGA Y51-Type Vehicle Service Manual (CD-ROM Version): November 2009, NISSAN MOTOR CO., LTD.

SUMMARY OF INVENTION

However, there is a problem in the conventional structure that the process of swinging the bracket to insert the protruding portions of the pins into the insertion holes of the bracket is difficult since the protruding portions of the pins are located at a position hard to be visually observed.

An object of the present invention is to provide a bumper attachment structure facilitating a process of attaching a bumper to a fender panel.

According to the present invention, a bumper attachment structure includes: a flange of a bumper fascia provided with a guide portion protruding therefrom; a flange of a fender panel having an insertion hole into which the guide portion can be inserted; an attachment bracket having a groove in which the guide portion can be housed; and an insertion fitting portion in which a tip portion of the attachment bracket can fit, wherein the guide portion is inserted into the insertion hole of the flange of the fender panel to protrude therefrom, a protruding portion of the guide portion is inserted into the groove of the attachment bracket so as to slide the attachment bracket along the protruding portion, and the tip portion of the attachment bracket is allowed to fit into the insertion fitting portion, so that the flange of the bumper fascia is attached to the flange of the fender panel in a manner such that the flange of the fender panel is held between the flange of the bumper fascia and the attachment bracket.

DESCRIPTION OF EMBODIMENTS

Figure 1:
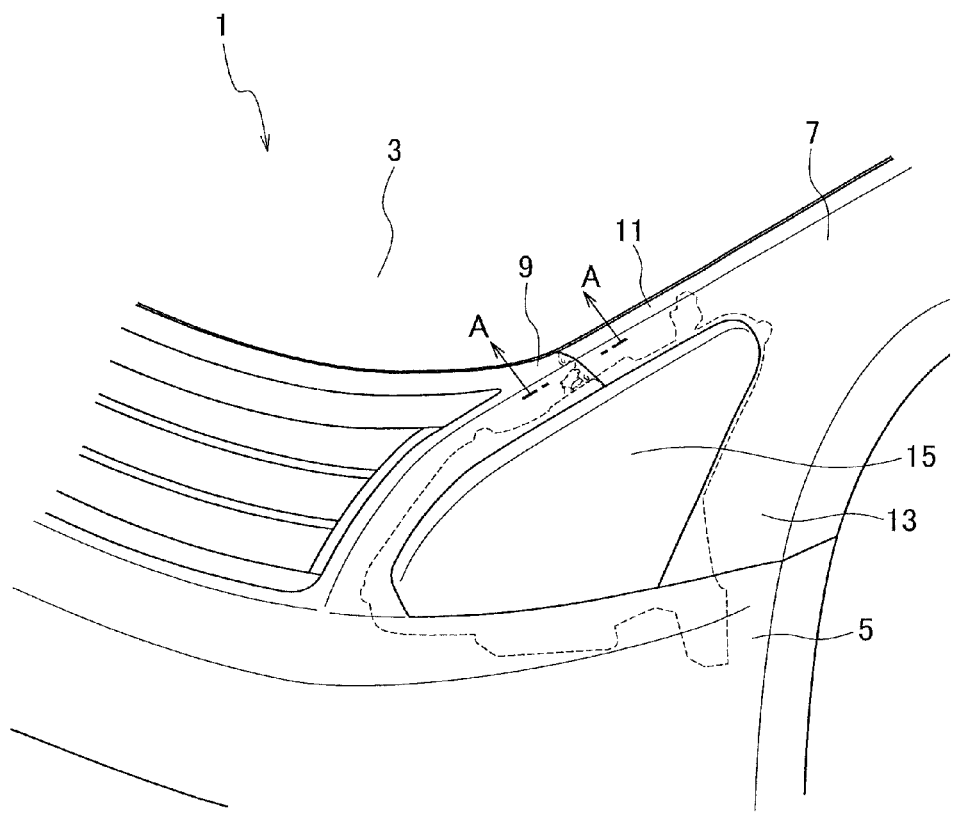
FIG. 1 is a perspective view showing a front end portion of a vehicle according to a first embodiment of the present invention.

Hereinafter, embodiments of the present invention will be explained in detail with reference to the drawings. Although a structure for attaching a front bumper is explained in the embodiments of the present invention, the present invention is not limited thereto and may be applied to a case of attaching a rear bumper. Note that, in the drawings, FR represents a front side, RR represents a rear side, IN represents an inner side in a vehicle width direction, and OUT represents an outer side in the vehicle width direction.

First Embodiment

As shown in FIG. 1, a front end portion 1 of a vehicle is provided with a bumper fascia 5 extending in the vehicle width direction on the front side of a hood panel 3, and is provided with a front fender panel 7 on the left side (on the outer side in the vehicle width direction) of the hood panel 3. The bumper fascia 5 is provided with a horn-shaped portion 9 extending towards the rear side of the vehicle. A front end portion of the front fender panel 7 is divided into a first branching portion 11 and a second branching portion 13 branching into the right and left directions. The first branching portion 11 is connected to the horn-shaped portion 9 of the bumper fascia 5, and the second branching portion 13 is connected to an edge portion of the vehicle in the vehicle width direction of the bumper fascia 5. A head lamp 15 is located at a position surrounded by the bumper fascia 5 and the front end portion of the front fender panel 7.

Figure 2:
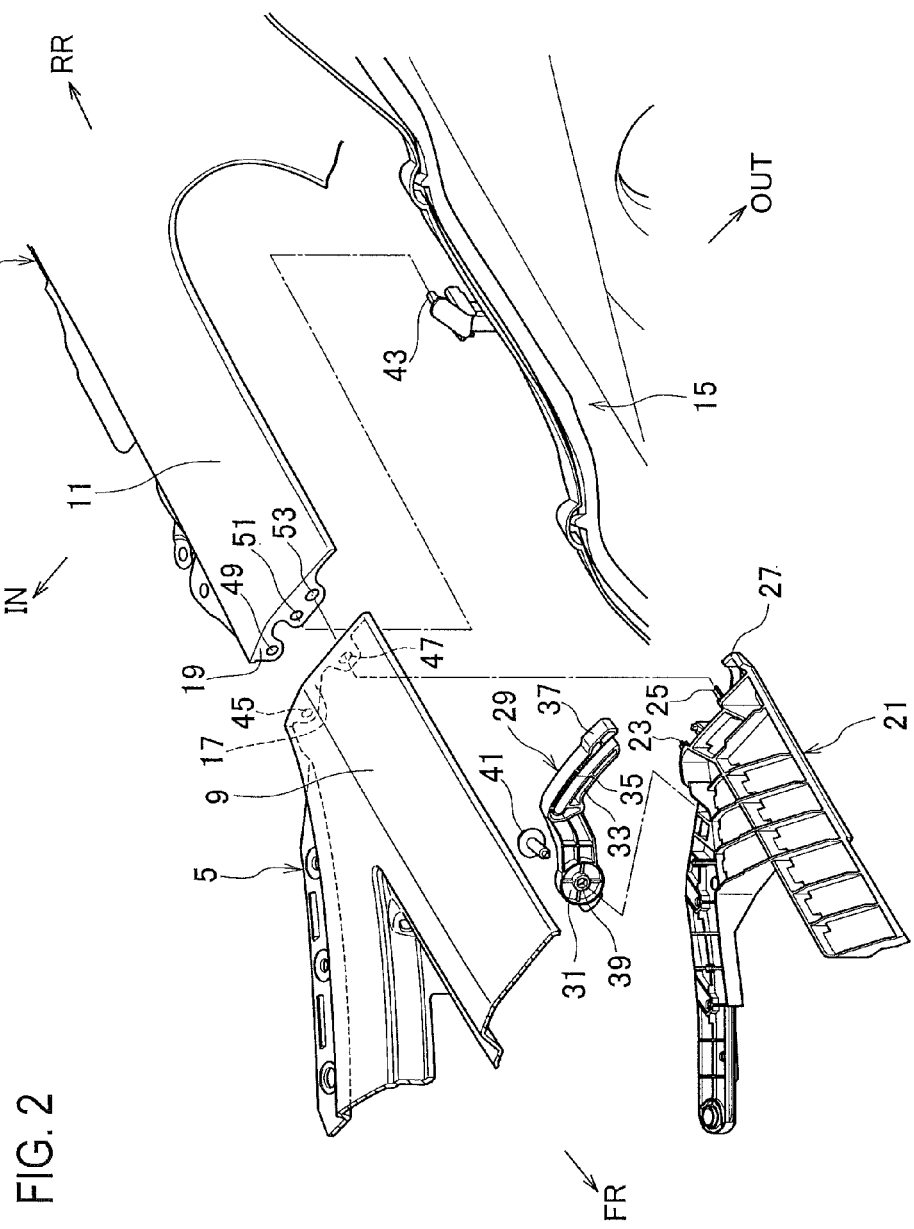
FIG. 2 is an exploded perspective view of FIG. 1.
Figure 3:
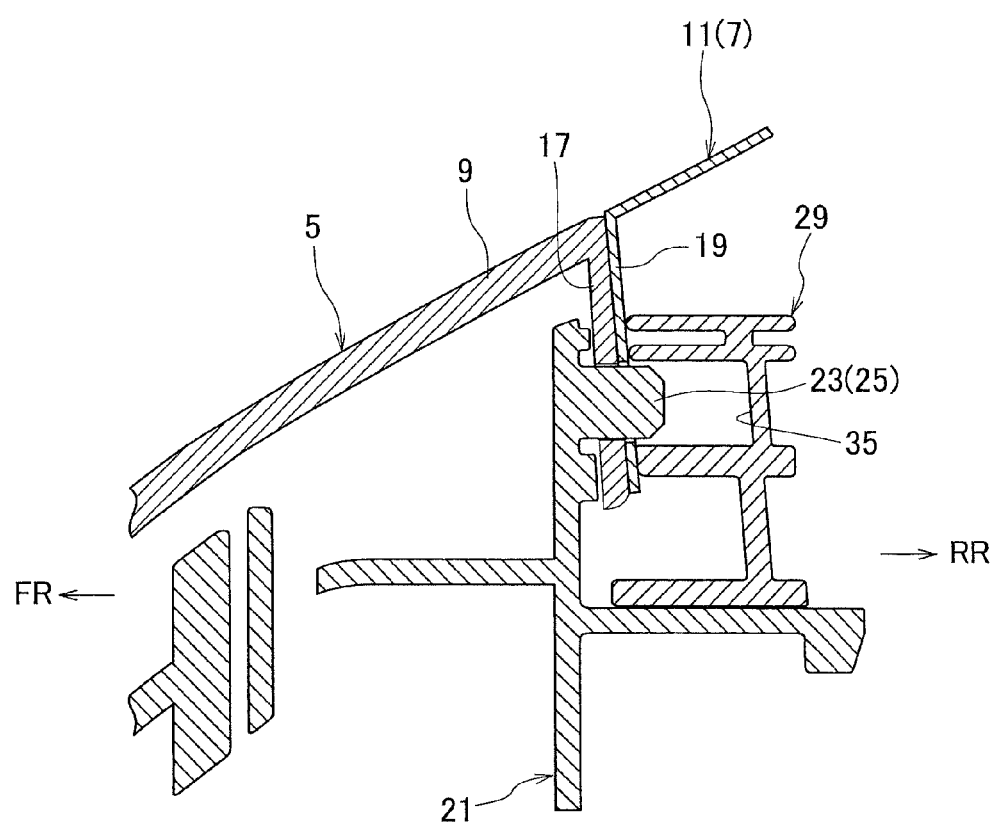
FIG. 3 is an enlarged cross-sectional view taken along the line A-A of FIG. 1.

As shown in FIG. 2 and FIG. 3, a flange 17 extending downward is formed at a rear end portion of the horn-shaped portion 9 of the bumper fascia 5, and a flange 19 extending downward is also provided at a front end portion of the first branching portion 11 of the front fender panel 7. A stiffener 21 is attached to the rear side (the lower side) of the horn-shaped portion 9 of the bumper fascia 5. A front end portion of the stiffener 21 is provided with a first pin 23 on the inner side in the vehicle width direction, a second pin 25 on the outer side in the vehicle width direction, and an insertion fitting portion 27 at the edge portion in the vehicle width direction. The first pin 23 and the second pin 25 both protrude rearward. A long attachment bracket 29 is composed of a base portion 31 formed on the inner side in the vehicle width direction in the attached state and a body portion 33 extending to the outer side in the vehicle width direction. The body portion 33 is provided with a groove 35 extending in the longitudinal direction (in the vehicle width direction), and is provided with a contact surface 37 protruding upward capable of coming into contact with the rear surface of the front fender panel 7. Here, the attachment bracket 29 is connected to the stiffener 21 via a fixing bolt 41 inserted into an attachment hole 39 of the base portion 31 in the end. The head lamp 15 is provided with a head lamp-side pin 43 protruding rearward. The first pin 23, the second pin 25 and the head lamp-side pin 43 serve as guide portions, as described below, to be inserted in the groove 35 of the attachment bracket 29 and arranged at predetermined intervals in the vehicle width direction.

The flange 17 of the horn-shaped portion 9 of the bumper fascia 5 is provided with a first insertion hole 45 on the inner side in the vehicle width direction and a second insertion hole 47 on the outer side in the vehicle width direction. The flange 19 of the first branching portion 11 of the front fender panel 7 is provided with a third insertion hole 49 on the inner side in the vehicle width direction, a fourth insertion hole 51 on the outer side of the third insertion hole 49 in the vehicle width direction, and a fifth insertion hole 53 on the outermost side in the vehicle width direction. The first pin 23 of the stiffener 21 is inserted into the first insertion hole 45 of the bumper fascia 5 and the third insertion hole 49 of the front fender panel 7. The second pin 25 of the stiffener 21 is inserted into the second insertion hole 47 of the bumper fascia 5 and the fifth insertion hole 53 of the front fender panel 7. The head lamp-side pin 43 of the head lamp 15 is inserted into the fourth insertion hole 51 of the front fender panel 7.

As shown in FIG. 3, tip portions of the first pin 23 and the second pin 25 of the stiffener 21 are inserted into the flange 17 of the bumper fascia 5 and the flange 19 of the front fender panel 7. The respective tip portions of the first pin 23 and the second pin 25 protrude from the insertion holes of the flange 19, and the protruding portions thereof are inserted and housed in the groove 35 of the attachment bracket 29. The base portion 31 of the attachment bracket 29 is connected to the stiffener 21 via the fixing bolt 41. Accordingly, the flange 17 of the bumper fascia 5 and the flange 19 of the front fender panel 7 are held between the stiffener 21 and the attachment bracket 29 so that the bumper fascia 5 is attached to the front fender panel 7.

Next, a process of attaching the bumper fascia 5 to the front fender panel 7 is explained below.

Figure 4:
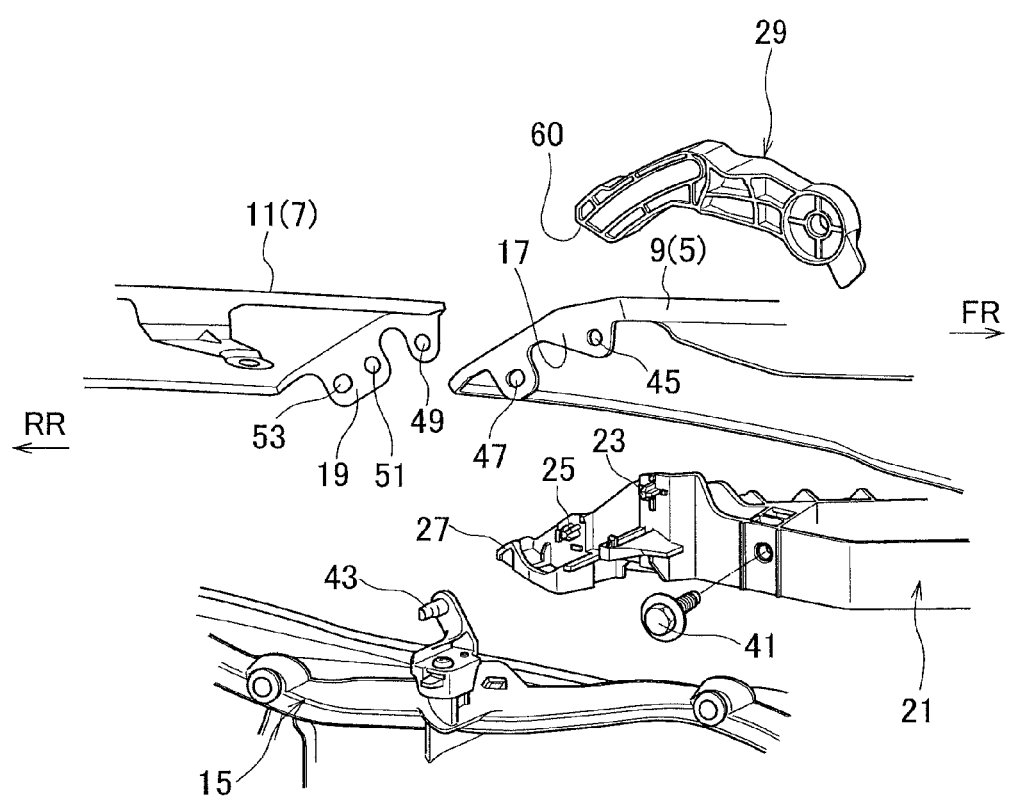
FIG. 4 is an exploded perspective view showing a stage before attaching a front bumper according to the first embodiment of the present invention.

As shown in FIG. 4, the flange 17 of the bumper fascia 5 and the flange 19 of the front fender panel 7 are positioned to face each other, the stiffener 21 is positioned on the lower side of the bumper fascia 5, and the head lamp 15 is positioned on the lower side of the bumper fascia 5 and the front fender panel 7.

Figure 5:
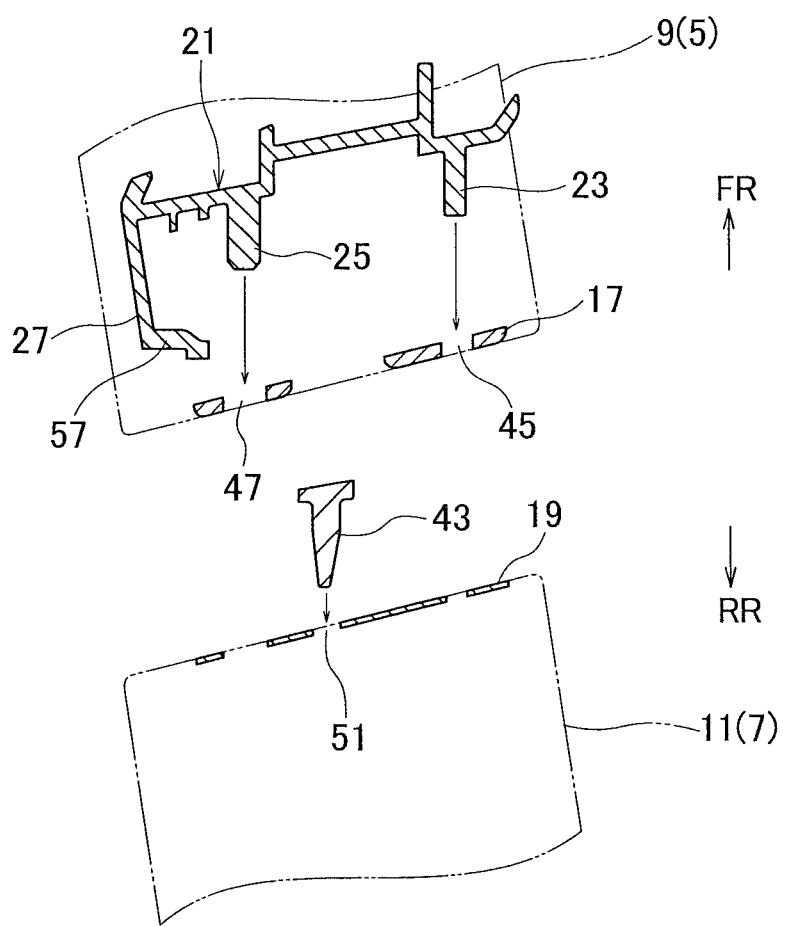
FIG. 5 is a schematic cross-sectional view corresponding to FIG. 4.
Figure 6:
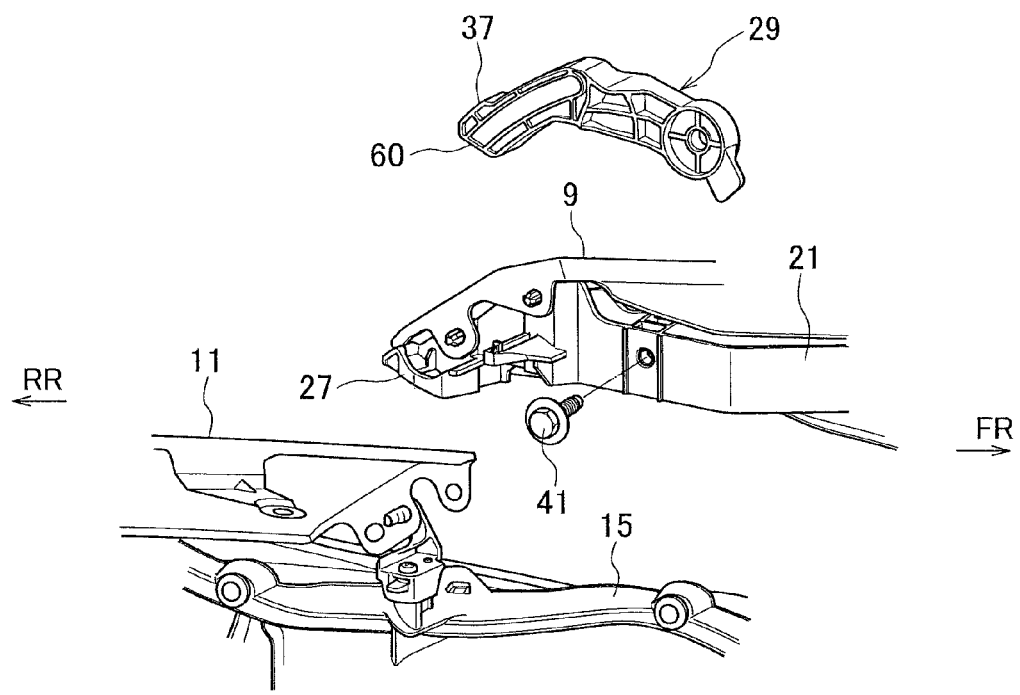
FIG. 6 is an exploded perspective view showing an early stage of attaching the front bumper according to the first embodiment of the present invention.
Figure 7:
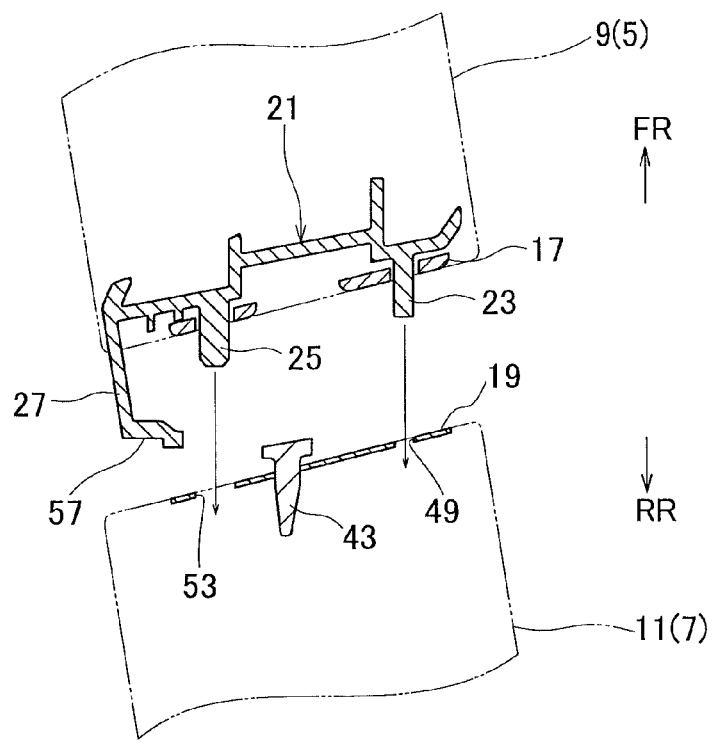
FIG. 7 is a schematic cross-sectional view corresponding to FIG. 6.

Then, as shown in FIG. 5 to FIG. 7, the first pin 23 and the second pin 25 of the stiffener 21 are inserted into the first insertion hole 45 and the second insertion hole 47 of the bumper fascia 5, respectively. At the same time, the head lamp-side pin 43 of the head lamp 15 is inserted into the fourth insertion hole 51 of the front fender panel 7.

Figure 8:
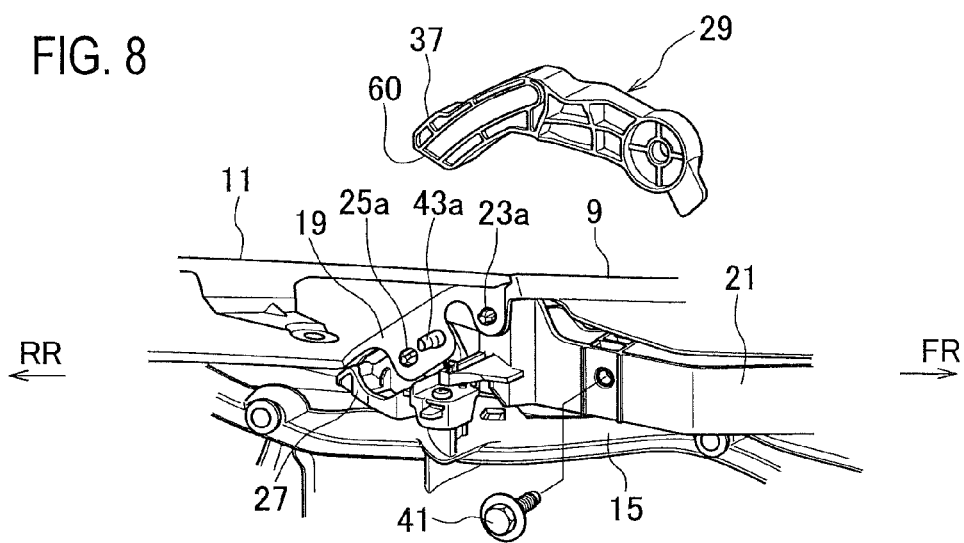
FIG. 8 is an exploded perspective view showing a middle stage of attaching the front bumper according to the first embodiment of the present invention.

As shown in FIG. 8, the first pin 23, the second pin 25 and the head lamp-side pin 43 are then arranged in a line at predetermined intervals in the vehicle width direction while the tip portions thereof protrude rearward from the flange 19 of the front fender panel 7.

Figure 9:
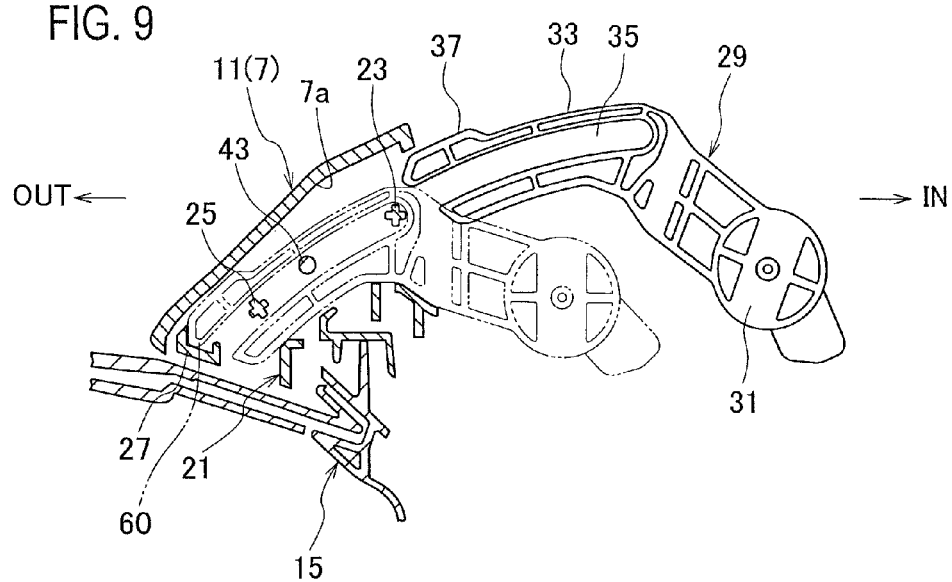
FIG. 9 is a cross-sectional view showing a state before and after inserting an attachment bracket.
Figure 10:
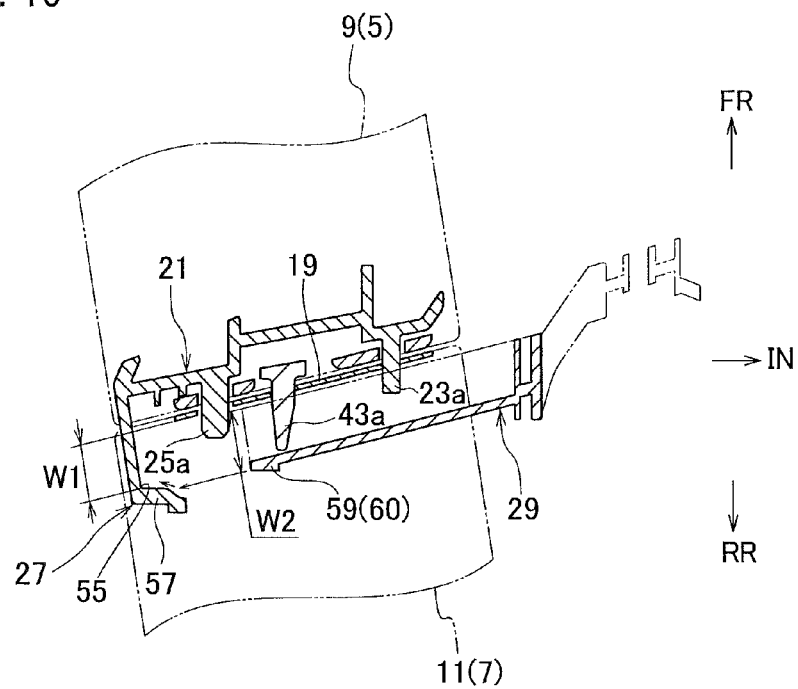
FIG. 10 is a schematic cross-sectional view before inserting the attachment bracket.

Subsequently, as shown in FIG. 9 and FIG. 10, protruding portions 23a, 25a and 43a of the first pin 23, the second pin 25 and the head lamp-side pin 43 are inserted into the groove 35 formed on the front side of the attachment bracket 29 (also refer to FIG. 2), and the attachment bracket 29 is allowed to slide in the direction along the groove 35. In particular, the operator holds the base portion 31 of the attachment bracket 29, inserts the first pin 23 first into the front portion of the groove 35, and then slides the attachment bracket 29 in the direction along the groove 35 (namely, along the protruding portions 23a, 25a and 43a). The attachment bracket 29 is thus allowed to slide in the direction along the groove 35 with respect to the protruding portions 23a, 25a and 43a of the first pin 23, the second pin 25 and the head lamp-side pin 43. Here, as shown in FIG. 9, the contact surface 37 is formed in the attachment bracket 29. The contact surface 37 comes into slide contact with the rear surface 7a of the front fender panel 7 when the attachment bracket 29 is allowed to slide.

Figure 11:
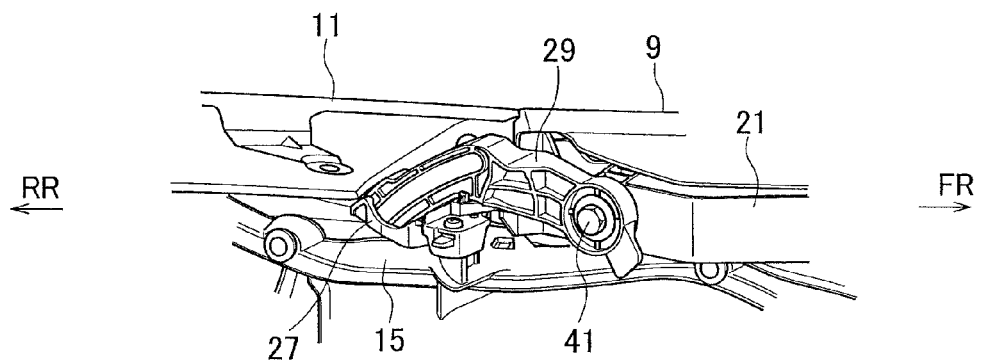
FIG. 11 is an exploded perspective view showing a final stage of attaching the front bumper according to the first embodiment of the present invention.
Figure 12:
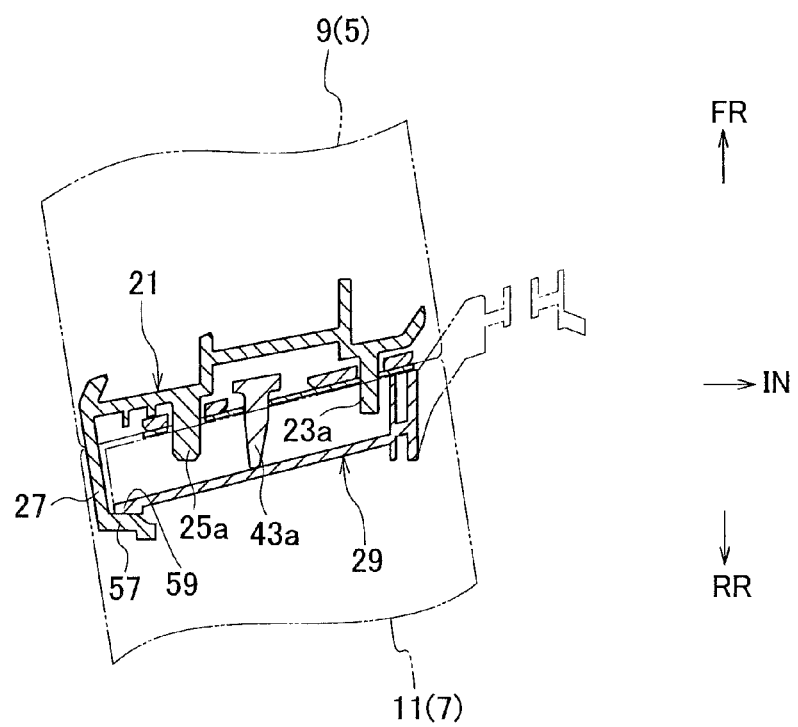
FIG. 12 is a schematic cross-sectional view corresponding to FIG. 11.

As shown in FIG. 10, width W1 between an inner end 55 of the insertion fitting portion 27 and the flange 19 of the front fender panel 7 is set to be smaller than width W2 of a taper portion 59 formed at a tip portion 60 of the attachment bracket 29. The insertion fitting portion 27 is provided, at the edge portion thereof, with a wall portion 57 obliquely extending from the inner end towards the inner side of the vehicle in the vehicle width direction. The taper portion 59 tapering towards the tip thereof is formed at the tip portion 60 of the attachment bracket 29. Therefore, the taper portion 59 of the attachment bracket 29 comes into contact with the wall portion 57 of the insertion fitting portion 27 so that the wall portion 57 is elastically deformed and pushed outward. The taper portion 59 of the attachment bracket 29 is then pressed by the wall portion 57 of the insertion fitting portion 27 so as to fit therein in the state shown in FIG. 11 and FIG. 12.

The following is an explanation of advantageous effects according to the present embodiment.

(1) The bumper attachment structure according to the present embodiment includes the first pin 23 and the second pin 25 (guide portions) protruding from the flange 17 of the bumper fascia 5, the third insertion hole 49 and the fifth insertion hole 53 (insertion holes) formed in the flange 19 of the front fender panel 7 so that the first pin 23 and the second pin 25 can be inserted thereinto, the attachment bracket 29 provided with the groove 35 in which the first pin 23 and the second pin 25 can be housed, and the insertion fitting portion 27 into which the tip portion of the attachment bracket 29 can fit. The first pin 23 and the second pin 25 are inserted into the insertion holes of the flange 19 of the front fender panel 7 to protrude therefrom, the protruding portions 23a and 25a thereof are inserted into the groove 35 of the attachment bracket 29 to slide along the groove 35, and the taper portion 59 of the tip portion 60 of the attachment bracket 29 is allow to fit into the insertion fitting portion 27. Accordingly, the flange 19 of the front fender panel 7 is held between the flange 17 of the bumper fascia 5 and the attachment bracket 29.

As described above, the protruding portions 23a and 25a of the first pin 23 and the second pin 25 are required to be inserted into the groove 35 of the attachment bracket 29 so as to slide the attachment bracket 29 in the direction along the groove 35. Therefore, the attachment bracket 29 can be attached even to a portion hard to be visually observed, so as to facilitate the process of attaching the bumper fascia 5. Further, the attachment bracket 29 is required to be fixed to the stiffener 21 with the fixing bolt 41 after sliding, so as to simplify the process of attaching the bumper fascia 5.

(2) The guide portions are the first pin 23 and the second pin 25 arranged at predetermined intervals in the sliding direction (in the inserting direction) of the attachment bracket 29.

Therefore, the attachment bracket 29 can be guided and allowed to slide with a simple structure.

(3) The contact surface 37 is formed in the attachment bracket 29 so as to come into slide contact with the rear surface 7a of the front fender panel 7 when the attachment bracket 29 is allowed to slide.

Therefore, the guiding performance improves when the attachment bracket 29 is allowed to slide, so as to further facilitate the process of attaching the bumper fascia 5.

(4) The width W1 between the inner end 55 of the insertion fitting portion 27 and the flange 19 of the front fender panel 7 is set to be smaller than the width W2 of the tip portion 60 of the attachment bracket 29.

Therefore, once the tip portion 60 of the attachment bracket 29 is inserted into the insertion fitting portion 27, the flange 19 of the front fender panel 7 is held between the flange 17 of the bumper fascia 5 and the attachment bracket 29. As a result, the attachment bracket 29 can be temporarily held so as to facilitate the process of fixing the fixing bolt 41.

Second Embodiment

Hereinafter, a second embodiment of the present invention will be explained. It should be noted that the elements having the same structures as those in the first embodiment are indicated by the same reference numerals, and the explanations thereof are not repeated.

In the first embodiment, the first pin 23 and the second pin 25 protruding rearward are arranged in the vehicle width direction at the rear end portion of the stiffener 21 so as to serve as guide portions.

In the second embodiment, on the other hand, the guide portion is a rib 61 continuously formed extending in the inserting direction of the attachment bracket 29. The second embodiment is explained in detail below.

Figure 13:
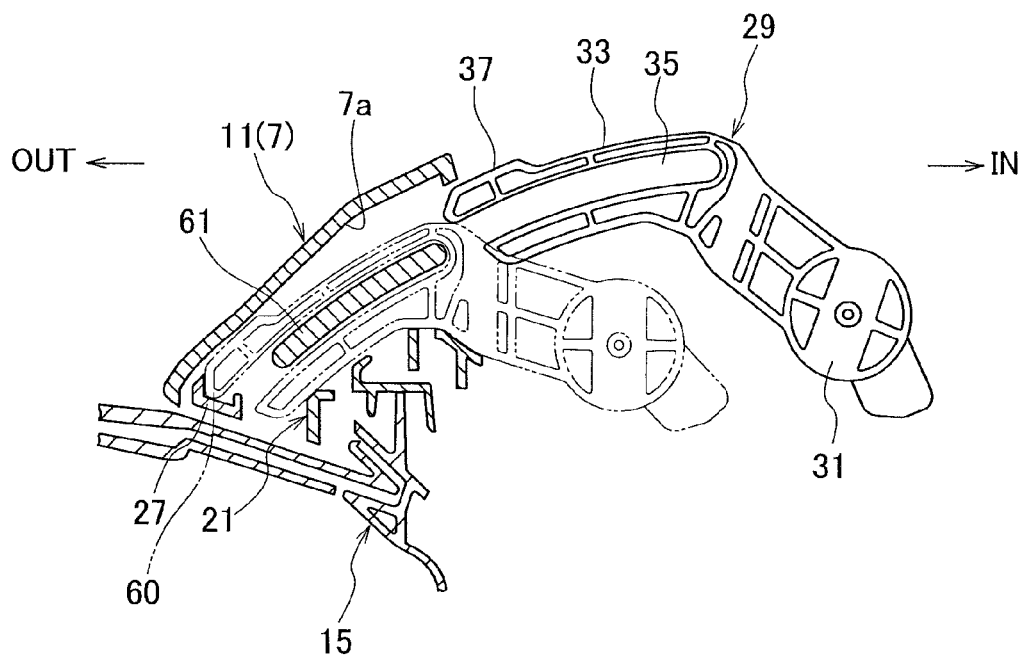
FIG. 13 is a cross-sectional view showing a state before and after inserting an attachment bracket according to a second embodiment of the present invention.

As shown in FIG. 13, the rib 61 protruding rearward is formed at the rear end portion of the stiffener 21. The rib 61 extends in the vehicle width direction (in the sliding direction of the attachment bracket 29).

Although not shown in the figure, the flange 17 of the bumper fascia 5 and the flange 19 of the front fender panel 7 are provided with insertion holes extending in the vehicle width direction. These insertion holes have a configuration into which the rib 61 can be inserted.

When the rib 61 is inserted into the insertion holes of the flange 17 and the flange 19, the tip portion of the rib 61 protrudes rearward from the flange 19. The protruding portion of the rib 61 is inserted into the groove 35 of the attachment bracket 29 so as to slide the attachment bracket 29 along the rib 61 towards the outer side in the vehicle width direction. Accordingly, the attachment bracket 29 is guided by the rib 61 so that the tip portion 60 of the attachment bracket 29 fits into the insertion fitting portion 27.

The following is an explanation of advantageous effects according to the present embodiment.

(1) According to the present embodiment, the rib 61 serves as a guide portion continuously formed extending in the sliding direction (in the inserting direction) of the attachment bracket 29.

Accordingly, the rigidity of the guide portion is improved, and the attachment strength of the bumper fascia 5 is also improved. Further, the rib 61 is continuously formed in the sliding direction of the attachment bracket 29, so as to facilitate the process of sliding the attachment bracket 29.

The entire content of Japanese Patent Application No. P2012-041337 (filed on Feb. 28, 2012) is incorporated herein by reference.

Although the present invention has been described above by reference to the embodiments, the present invention is not limited to the descriptions thereof, and it will be apparent to those skilled in the art that various modifications and improvements can be made.

INDUSTRIAL APPLICABILITY

According to the present invention, the protruding portions of the guide portions are required to be inserted into the groove of the attachment bracket to slide the attachment bracket along the protruding portions, so as to facilitate the process of attaching the bumper to the fender panel.

REFERENCE SIGNS LIST

5 Bumper Fascia
7 Front Fender Panel (Fender Panel)
17 Flange
19 Flange
23 First Pin (Guide Portion)
23a, 25a Protruding Portion
25 Second Pin (Guide Portion)
28 Insertion Fitting Portion
29 Attachment Bracket
35 Groove
55 Inner end
60 Tip Portion
61 Rib (Guide Portion)

The invention claimed is:

1. A bumper attachment structure, comprising:
a flange of a bumper fascia provided with a guide portion protruding therefrom;
a flange of a fender panel having an insertion hole into which the guide portion can be inserted;
an attachment bracket having a groove in which the guide portion can be housed; and
an insertion fitting portion in which a tip portion of the attachment bracket can fit,
wherein the guide portion is inserted into the insertion hole of the flange of the fender panel to protrude therefrom, a protruding portion of the guide portion is inserted into the groove of the attachment bracket so as to slide the attachment bracket along the protruding portion, and the tip portion of the attachment bracket is allowed to fit into the insertion fitting portion, so that the flange of the bumper fascia is attached to the flange of the fender panel in a manner such that the flange of the fender panel is held between the flange of the bumper fascia and the attachment bracket.

2. The bumper attachment structure according to claim 1, wherein the guide portion comprises a plurality of pins arranged at a predetermined interval in an inserting direction of the attachment bracket.

3. The bumper attachment structure according to claim 1, wherein the guide portion comprises a rib continuously formed extending in a sliding direction of the attachment bracket.

4. The bumper attachment structure according to claim 1, wherein a contact surface is formed in the attachment bracket so as to come into slide contact with a rear surface of the fender panel when the attachment bracket is allowed to slide.

5. The bumper attachment structure according to claim 1, wherein a width between an inner end of the insertion fitting portion and the flange of the fender panel is set to be smaller than a width of the tip portion of the attachment bracket.

6. The bumper attachment structure according to claim 2, wherein a contact surface is formed in the attachment bracket so as to come into slide contact with a rear surface of the fender panel when the attachment bracket is allowed to slide.

7. The bumper attachment structure according to claim 3, wherein a contact surface is formed in the attachment bracket so as to come into slide contact with a rear surface of the fender panel when the attachment bracket is allowed to slide.

8. The bumper attachment structure according to claim 2, wherein a width between an inner end of the insertion fitting portion and the flange of the fender panel is set to be smaller than a width of the tip portion of the attachment bracket.

9. The bumper attachment structure according to claim 3, wherein a width between an inner end of the insertion fitting portion and the flange of the fender panel is set to be smaller than a width of the tip portion of the attachment bracket.

10. The bumper attachment structure according to claim 4, wherein a width between an inner end of the insertion fitting portion and the flange of the fender panel is set to be smaller than a width of the tip portion of the attachment bracket.

\* \* \* \* \*